United States Patent Office 3,105,005
Patented Sept. 24, 1963

3,105,005
METHODS OF DESTROYING NEMATODES WITH A PYRIDINE BASE AND ITS ACID ADDITION SALTS
William N. Cannon and Granville Bruce Kline, both of Greenwood, and James E. Cochran, Jr., and Quentin F. Soper, both of Indianapolis, Ind., assignors to Eli Lilly and Company, Indianapolis, Ind., a corporation of Indiana
No Drawing. Filed July 25, 1960, Ser. No. 44,898
9 Claims. (Cl. 167—33)

This invention relates to a novel method for controlling the nematode population in agricultural soils.

Nematodes are found in temperate and tropical regions in all types of soil at depth of five feet or more below the surface. It is difficult to control the nematode population, particularly in soils used for agricultural purposes, because of the exacting requirements for an effective nematode control agent. For example, the ideal nematocidal agent should be toxic to the nematode upon absorption or contact; it must be essentially nontoxic to the plant life grown in the same soil; and it should persist in the soil for a considerable period of time. This last requirement is a particularly difficult one to meet since the chemical employed as a nematocide must thus be not only relatively nonvolatile but also resistant to microbial degradation. Most of the nematocidal compounds of the prior art have been halogenated hydrocarbons of the type commonly used as fumigants. These compounds, while effective, have had several disadvantages, among which have been a substantial toxicity for both plant and animal life and an excessively high vapor pressure causing a lack of persistence in the soil.

It is an object of this invention to provide a method of controlling nematodes in agricultural soils by employing a class of chemical compounds capable of fulfilling the above enumerated requirements for a nematode control agent.

In fulfillment of the above and other objects, this invention provides a method of controlling nematodes in agricultural soils infested therewith which comprises adding to and mixing with said soil a nematocidal amount of a pyridine base having one of the following formulas:

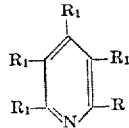

and

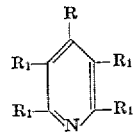

wherein R is a radical of the group consisting of

and

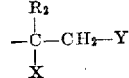

each $R_1$ is hydrogen or lower alkyl, such as methyl, ethyl or propyl, $R_2$ is hydrogen, chlorine or bromine, and X and Y are either chlorine or bromine. Also included within the scope of this invention are acid addition salts of pyridine bases represented by the above formulas.

Illustrative pyridine bases and their salts useful in the nematocidal processes of this invention include the following compounds: 2-vinylpyridine, 4-vinylpyridine hemioxalate, 2-vinyl-4-ethylpyridine bisulfate, 4-vinyl-2,6-diethylpyridine, 4-vinyl-2-n-propylpyridine, 4-(α-chlorovinyl)pyridine hydrochloride, 2-(α,β-dibromo-ethyl)pyridine hydrobromide, 2-(α-bromovinyl)-4,6-dimethylpyridine hydromide, 2-(α,β-dichloro-ethyl)5-ethylpyridine hydrochloride, 2-vinyl-3-methylpyridine hemichloroplatinate, 2-(α-bromo-α,β-dichloro-ethyl)pyridine hydrochloride, and 4-(α,β-dibromo-ethyl)pyridine hydrobromide.

In the novel processes of this invention, a pyridine base represented by one of the above formulas, either in the form of the free base or as an acid addition salt thereof, is applied directly to the soil at the rate of from about 1 to about 256 lb. per acre. The compounds can be applied to the soil directly or they can be diluted with various inert solid of liquid diluents and then applied to the nematode-infested area. The preferred level of application of a nematocidal pyridine base to soils of average nematode infestation is from about 4 to about 128 lb. per acre. When an acid addition salt of a nematocidal pyridine base is used, the rate of application will, of course, depend upon the amount of base actually present, since the acids which form salts with these pyridine bases contribute little or nothing to the nematocidal activity of the base and the salts themselves are employed chiefly for ease of handling and formulating. The following acids can be employed to form acid addition salts of the pyridine bases useful as nematocidal agents according to the provisions of this invention: sulfuric, hydrochloric, hydrobromic, nitric, oxalic, tartaric, maleic, benzoic, succinic, chloroplatinic, tungstic and the like.

While most of the compounds represented by one of the above formulas are stable in the form of the free bases, certain of them, particularly in aqueous solution, tend to eliminate the elements of a hydrogen halide or to polymerize. When the elements of a hydrogen halide are eliminated, there is formed a hydrogen halide acid addition salt of a pyridine free base having a new double bond formed by the hydrogen halide elimination reaction. In accordance with the above teachings, the free pyridine bases represented by the above formulas which can eliminate the elements of a hydrogen halide are customarily stored and used in the form of an acid addition salt, although it is possible to prepare the potentially unstable free base and immediately apply it to the nematode-infested soil. In addition, those pyridine bases which can polymerize are customarily kept in contact with a polymerization inhibitor which can be, if desired, removed prior to application of the free base to a nematode-infested soil.

The use of the pyridine bases represented by the above formulas as nematode control agents can be illustrated by the following procedure. A test soil was prepared by thoroughly mixing two parts of white-plaster sand, two parts of masonry sand and one part of dried loam. The resulting soil mixture was sifted through a fine screen and was dampened so that the soil crumbled and rolled readily. An amount of the pyridine base or acid addition salt thereof whose activity as a nematode control agent was to be evaluated, was weighed out and placed in a clean, 4-ounce jar. 2.5 ml. of hydrated silicon dioxide were added as a carrier, and the test compound and carrier were mixed carefully. 100 g. of the previously prepared soil were then added to the jar, and the jar was rolled for about 30 minutes to insure thorough mixing. 5 ml. of a nematode inoculum in the form of macerated galls and egg masses from cucumber roots infected with *Meloidogyne incognita*—southern root-knot nematode—were added to the treated soil in the 4-ounce jar, and the jar was again shaken to distribute the inoculum. The jar was then capped and placed on a shelf in an incubator room maintained at about 78° C. After 10 days, the jar was removed from the incubator and the treated nematode-infested soil was removed from the jar and placed in a 6-ounce, wax-coated, paper cup with drainage holes punched in the bottom. Five cucumber seeds were planted in the soil which was then watered. The wax-coated, paper cup was placed in a greenhouse provided with 80° F. bottom heat under fluorescent lights for a period of 14 days, watering being provided as necessary. At the end of the 7th day following planting of the seed, the cup was checked, and if no seedlings were evident, an additional five seeds were planted. At the end of the 24th day following the initial seeding, the seedlings were removed from the soil and their roots examined for nematode galls. Disease ratings were given according to the number of nematode galls and severity of the infection. Control jars containing no nematocide and control jars containing commercially available nematocides were also subjected to the identical test. Chart I, which follows, gives the results of these tests. In the chart, column 1 gives the name of the compound under test; column 2, the plant disease rating at an application rate of 256 lb. per acre; and columns 3, 4, 5 and 6, the disease ratings corresponding to application rates of 128, 64, 32, and 16 lb. per acre respectively. The following rating scale was employed: rating of 1—severe disease indistinguishable from the untreated control; rating of 2—moderately severe disease; rating of 3—moderate disease; rating of 4—slight disease; and rating of 5—no disease.

CHART I

| Name | Disease Ratings at lb./acre | | | | |
|---|---|---|---|---|---|
| | 256 | 128 | 64 | 32 | 16 |
| 4-Vinylpyridine | 5 | 5 | 5 | 3.2 | 1.5 |
| 2-Vinylpyridine | 5 | 5 | 5 | 5 | 4.8 |
| 2-Vinyl-5-ethylpyridine | 5 | 5 | 3.5 | 1.6 | 1 |
| 5-Vinyl-2-picoline | 4.3 | 3.2 | 2 | 1 | 1 |
| 4-Vinylpyridine hydrobromide | 5 | 4.5 | 2.5 | 1 | 1 |
| 2-Vinylpyridine hydrochloride | 5 | 5 | 5 | 5 | 4.8 |
| 2-Vinylpyridine hemisulfate | 5 | 5 | 5 | 5 | 5 |
| 4-Vinylpyridine hydrochloride | 5 | 5 | 5 | 5 | 1 |
| 4-Vinylpyridine hemisulfate | 5 | 4.5 | 3.5 | 2.5 | 1 |
| 2-Vinyl-5-ethylpyridine hydrochloride | 5 | 3.8 | 1.8 | 1.1 | 1 |
| 2-Vinylpyridine hemi-oxalate | 1 5 | 1 4.4 | 3.5 | 1.5 | 1 |
| 2-(α-chlorovinyl)pyridine hydrochloride | 5 | 5 | 5 | 5 | 5 |
| 2-(α,β-dichlorethyl)pyridine hydrochloride | 1 5 | 1 5 | 5 | 5 | 5 |
| 2-(α,α,β-trichlorethyl)pyridine hydrochloride | | 3.5 | 1 | 1 | 1 |
| 2-(α-bromovinyl)pyridine hydrobromide | | 5 | 5 | 5 | 5 |
| 2-(α,α,β-trichlorethyl)pyridine | | 4 | 2 | 1 | 1 |

1 Stunting of plants.

Certain of the compounds were further tested as nematode control agents by the method outlined above, but lower rates of application were employed. Chart II, which follows, gives the results of these additional tests.

CHART II

| Name | Disease Ratings at lb./acre | | |
|---|---|---|---|
| | 8 | 4 | 2 |
| 2-Vinylpyridine hydrochloride | 4 | 1 | |
| 2-Vinylpyridine hemisulfate | 3.6 | 1 | |
| 2-(α,β-Dichlorethyl)pyridine hydrochloride | 4.8 | 2.7 | 1 |
| 2-(α-Chlorovinyl)pyridine hydrochloride | 5 | 5 | 3.2 |
| 2-(α-Bromovinyl)pyridine hydrobromide | 5 | 4.6 | 1 |

A second procedure was also used for the evaluation of the nematocidal activity of the pyridine bases represented by the above formulas and their acid addition salts. This second procedure involved a somewhat more stringent test of the ability of the compound to control nematode infestation in the soil. In this procedure, a number of clean, six-inch azalea pots were prepared, each containing about 1500 g. of a nematode-infested soil. Previously, cucumbers or tomatoes infected with root-knot nematodes had been grown in the soil. The requisite quantity of the compound under test was weighed out, and if it was a dry material or a nonvolatile liquid, it was mixed with a dry carrier, such as a hydrated silicon dioxide. If the compound under test was a relatively volatile liquid, the weighed amount was placed in a hypodermic syringe and was injected into the center of the pot, thus diffusing throughout the soil. The soil and carrier containing the active nematocide were placed in a polyethylene bag and shaken thoroughly in order to insure mixing. The treated soil was then returned to the pot. These pots were maintained at greenhouse temperature of 80° F. for a period of from 7 to 10 days, after which time 8 cucumber seeds were planted in each pot. A 1.5-inch layer of sand was placed over the seed and the pots were watered. After the cucumber seeds had sprouted, they were allowed to grow for 3 weeks. The plants were then removed from the pot, the soil washed off of their roots, and the degree of nematode infection recorded in the manner previously set forth. Chart III, which follows, gives the results of testing of certain of the compounds of this invention in the above test, particularly the vinylpyridines and their salts. The same rating scale previously used was employed in evaluating the nematocidal activity of the compounds under test. In Chart III, column 1 gives the name of the compound used; column 2, the disease rating at 128 lb. per acre; column 3, at 64 lb. per acre; column 4, at 32 lb. per acre; and column 5, at 16 lb. per acre.

CHART III

| Name of Compound | Disease Rating at 128 lb./acre | Disease Rating at 64 lb./acre | Disease Rating at 32 lb./acre | Disease Rating at 16 lb./acre |
|---|---|---|---|---|
| 4-Vinylpyridine | 5 | 4.4 | 4.5 | 3.5 |
| 2-Vinylpyridine | 5 | 5 | 4.8 | 4 |
| 2-Vinylpyridine hydrochloride | 5 | 5 | 2.5 | 1 |
| 2-Vinylpyridine hemisulfate | 5 | 3.5 | 1 | 1 |
| 4-Vinylpyridine hydrochloride | 5 | 4.5 | 2 | 1 |
| 4-Vinylpyridine hemisulfate | 5 | 5 | 3.5 | 1 |
| 2-Vinyl-5-ethylpyridine | 4.5 | 3 | 1 | 1 |
| 2-(α-Chlorovinyl) pyridine hydrochloride | 5 | | | |
| 2-(α,β-Dichlorethyl)pyridine hydrochloride | 5 | | | |

One of the compounds included within the scope of the above formulas, 2-vinylpyridine, was field-tested for its ability to control Southern root-knot nematode by the following procedure: 7 trenches, 12 inches wide by 12 inches deep and 15 feet long, were dug in a level field. A soil mixture consisting of two parts masonry sand and one part clay loam was added to the trenches to a depth of about 8 inches. A sandy soil in which root-knot infected tomatoes had been grown was added in sufficient quantity to bring the contents of the trench up to ground level. The soil mixture in the trenches was turned over with a spade several times to insure thorough distribution of the nematode inoculum. The soil was then compacted and moistened. One week after the inoculum had been added, 2-vinylpyridine was applied by direct injection into the soil at a depth of 8 inches on 12-inch centers down the middle of the trench. The amounts of 2-vinylpyridine employed in each trench were equivalent to an application rate of 480, 320, 120, 32 and 16 lb. per acre, two of the trenches being used as controls. In one of the control trenches, no nematode inoculum was added, and in the other, a nematode inoculum was added but no nematode-control chemical was used. The surface of the treated soil was compacted lightly and moistened with water to seal in the 2-vinylpyridine. After a period of 10 days, 14 young tomato seedlings, Bonny Best variety, were planted down the middle of each trench on 16-inch centers. The tomato plants were permitted to grow for a period of 35 days, after which time the roots of each plant were inspected for root-knot nematode infection. The same rating scale, using ratings from 1–5, was employed to estimate the amount of nematode infection as in the previous two procedures. Chart IV, which follows, gives the results of this field trial. In the chart, column 1 gives the name of the compound used; column 2 gives the disease rating at a 480 lb.-per-acre application rate for 2-vinylpyridine; column 3, the disease rating at 320 lb. per acre; column 4, at 120 lb. per acre; column 5, at 32 lb. per acre; column 6, at 16 lb. per acre; and column 7, at 0 lb. per acre.

CHART IV.—FIELD TRIAL USING 2-VINYLPYRIDINE AGAINST SOUTHERN ROOT-KNOT NEMATODE

| Name | Disease Ratings at lb./acre | | | | | |
|---|---|---|---|---|---|---|
| | 480 | 320 | 120 | 32 | 16 | 0 |
| 2-Vinylpyridine | 5 | 5 | 5 | 5 | 4 | ¹1 |

¹ Inoculated control.

Tomato plants grown in the uninoculated control trench had a disease rating of 5.

The free bases which are useful in the nematocidal processes of this invention, can be injected directly into the nematode-infested soil by the methods commonly in use with the more volatile, fumigant type of nematocidal agents. Thus, the liquid free bases can be distributed as such to the infested area at depths up to 12 or even 24 inches below the soil level by injection or drilling techniques. Water solutions of the acid addition salts of free bases represented by the above formulas can also be distributed to the nematode-infested soil in the same way. In applying the free bases to an infested area by the above methods, solvents such as kerosene can be used if desired for easier handling. The liquid free bases can also be distributed to a nematode-infested area by absorbing the free bases onto a solid carrier and distributing this formulation broadcast. The carrier having the free base absorbed thereon is then disked or plowed into the ground so as to facilitate contact with the nematode habitat. The acid addition salts of the free bases represented by the above formulas can, of course, also be spread as such upon the infested area either as solids or as aqueous solutions, or can be mixed with an inert solid diluent, and the mixture can be distributed and mixed with soil as previously set forth. For use with greenhouse soils, the methods of mixing the nematocidal agent with the soil previously set forth in the description of the evaluation procedures can be used. Among the inert diluents which can be mixed with solid compounds coming within the scope of the above formulas, are fertilizers, irrigation water, and the like. Thus, the diluted nematocidal compositions of this invention can contain as little as one lb. of nematocide in ten tons of fertilizer up to compositions consisting of 99.5 percent of the free base or acid addition salt thereof, and 0.5 percent of a diluent.

Among the nematodes which can be controlled by the processes and compositions of this invention are endoparasitic nematodes, including both root-knot nematodes such as *Meloidogyne hapla, Meloidogyne incognita, Meloidogyne javanica,* and root lesion nematodes such as *Pratylenchus vulnis, Pratylenchus zeae, Radopholus similis, Tylenchulus semipenetrans,* as well as ectoparasitic nematodes, including sting nematodes such as *Belonolaimus gracilis, Cacopaurus pestis,* and dagger nematodes such as Xiphinema species.

Some of the compounds represented by the above formulas, which compounds are useful in the nematocidal processes and compositions of this invention, are commercially available. However, certain of the compounds, particularly those containing halogen in the pyridine side chain, are novel, and the preparation of these novel compounds is illustrated by the following specific examples.

EXAMPLE 1

*Preparation of 2-(α,β-Dichlorethyl)Pyridine*

200 g. of 2-vinylpyridine were dissolved in 1000 ml. of ether. Anhydrous gaseous hydrogen chloride was passed through the solution, thus forming 2-vinylpyridine hydrochloride which precipitated and was collected by filtration. 200 g. of 2-vinylpyridine hydrochloride thus prepared were dissolved in 1200 ml. of anhydrous chloroform. A solution containing 142 g. of chlorine and 2000 ml. of anhydrous chloroform was prepared by adding the chlorine to the chloroform solution while it was cooled in a Dry-Ice ethanol coolant. The chlorine solution was added to the 2-vinylpyridine hydrochloride solution while maintaining the temperature at about 0° C. The addition required about one hour. After the addition of the chlorine solution had been completed, the reaction mixture was allowed to slowly come to ambient room temperature, at which temperature it was allowed to remain for about 14 hours. The reaction mixture was filtered and the filtrate containing 2-(α,β-dichlorethyl)pyridine hydrochloride prepared in the above reaction was concentrated by evaporation in vacuo until crystals of 2-(α,β-dichlorethyl)pyridine hydrochloride had begun to form. The concentrate was cooled and the crystals were collected by filtration and were dried. 2-(α,β-dichlorethyl)pyridine hydrochloride thus prepared melted at about 125–126.5° C.

*Analysis.*—Calc.: N, 6.59. Found: N, 6.43.

EXAMPLE 2

*Preparation of 2-(α,β-Dibromo-Ethyl)Pyridine*

Following the procedure of Example 1, 62.4 g. of bromine in 200 ml. of anhydrous chloroform were added to a solution containing 50 g. of 2-vinylpyridine hydrochloride while maintaining the temperature between 0 and 2° C. After the addition had been completed, the reaction mixture was stirred for about 4 hours with the temperature rising only to about 16° C. At the end of this time, the reaction mixture consisted of two distinct phases, an upper, yellow phase and a lower, red phase. The two phases were separated and eventually evaporated to dryness in vacuo. Both phases yielded a red, taffy-like solid. In each instance, the taffy-like solid was dissolved in hot, anhydrous ethanol and the ethanol solution was chilled at about 0° C. for 24 hours. Both ethanol solutions yielded crystalline 2-(α,β-dibromo-ethyl)pyridine hydrochloride which melted at about 143–145.5° C. after a second recrystallization from anhydrous ethanol.

*Analysis.*—Calc.: C, 27.89; H, 2.67; N, 4.65. Found: C, 28.01; H, 3.03; N, 4.62.

EXAMPLE 3

*Preparation of 2-(α,β-Chlorovinyl)Pyridine*

30 g. of 2-(α,β-dichlorovinyl)pyridine hydrochloride were dissolved in 100 ml. of water. 11.9 g. of sodium bicarbonate were added, thus forming the free base of 2-(α,β-dichlorovinyl)pyridine. The free base was insoluble in the alkaline solution and was extracted with 150 ml. of ether. The ether solution was separated and was dried. An aliquot of the dried ether solution containing 10 g. of 2-(α,β-dichlorovinyl)pyridine in 100 ml. of ether was evaporated to dryness in vacuo. 12 ml. of anhydrous ethanol were added, and the mixture was heated at refluxing temperature for about 5 hours. The reaction mixture was slowly cooled to ambient room temperature and was then chilled to about 0° C. A crystalline precipitate of 2-(α-chlorovinyl)pyridine hydrochloride precipitated during this time and was separated by filtration. Addition of ether to the filtrate yielded an additional crop of crystals of the same compound. The two crops of crystals were combined and were crystallized from anhydrous ethanol.

2-(α-chlorovinyl)pyridine hydrochloride melted at about 138–143° C.

*Analysis.*—Calc.: N, 7.96. Found: N, 7.60.

EXAMPLE 4

*Preparation of 2-(α-Chlorovinyl)Pyridine Hydrochloride*

The procedure of Example 3 was repeated using an aliquot of the ethereal solution of the free base containing 5 g. of 2-(α,β-dichlorovinyl)pyridine in 50 ml. of ether, except that the free base was mixed and heated for 2 hours with 2.8 g. of triethylamine instead of with anhydrous ethanol as in that example. After the heating period, 100 ml. of ether were added to the reaction mixture and triethylamine hydrochloride, a by-product of the above reaction, was removed by filtration. The ethereal filtrate containing the free base of 2-(α-chlorovinyl)pyridine formed in the above reaction was treated with anhydrous gaseous hydrogen chloride. 2-(α-chlorovinyl)pyridine hydrochloride thus formed was separated by filtration and was recrystallized from anhydrous ethanol.

EXAMPLE 5

*Preparation of 2-(α-Bromovinyl)Pyridine*

Following the procedure of Example 3, 10 g. of 2-(α,β-dibromo-ethyl)pyridine hydrochloride were dissolved in water, the water solution was made basic with sodium bicarbonate, and the 2-(α,β-dibromo-ethyl)pyridine free base thus formed was extracted into ether. The ether extract was separated and was dried. Evaporation of the ether in vacuo yielded a residue comprising 2-(α,β-dibromo-ethyl)pyridine free base which, upon remaining at ambient room temperature for about 3 days, reacted intermolecularly to form a black, crystalline mass of 2-(α-bromovinyl)pyridine hydrobromide. Recrystallization of the crystalline mass from anhydrous ethanol yielded 2-(α-bromovinyl)pyridine hydrobromide melting at about 150–153° C.

*Analysis.*—Calc.: Br, 60.32; N, 5.29. Found: Br, 60.93; N, 5.27.

EXAMPLE 6

*2-(α,α,β-Trichlorethyl)Pyridine Hydrochloride*

4 g. of 2-(α-chlorovinyl)pyridine hydrochloride were dissolved in 30 ml. of anhydrous chloroform. A solution containing 7.2 g. of chlorine in 50 ml. of anhydrous chloroform was prepared by adding the chlorine to the chloroform while maintaining the latter in a Dry-Ice ethanol coolant. The chlorine solution was added to the chloroxvinylpyridine solution while maintaining the temperature between 0 and 4° C. The mixture was stirred for about 2 hours while being maintained in the same temperature range and was then allowed to remain overnight at ambient room temperature. Evaporation of the reaction mixture to dryness in vacuo yielded 2-(α,α,β-trichlorethyl)pyridine hydrochloride as a cream-colored solid. The compound melted with decomposition at about 128–129° C. after two recrystallizations from anhydrous ethanol.

Analysis.—Calc.: N, 5.67. Found: N, 6.00.

Other novel compounds represented by the above formulas can be prepared by adapting the pertinent procedure as set forth above to the preparation of the desired compound.

EXAMPLE 7

*Preparation of Salts of Pyridine Bases*

Salts of pyridine bases represented by the above formulas are prepared by dissolving one equivalent of the base in ether or an alcohol and adding thereto an equivalent amount of the acid as an ethereal or aqueous solution, depending upon the solubility of the acid. The acid addition salt is then recovered either by evaporation of the solvent or by simple filtration if the acid addition salt is insoluble in the reaction solvent.

The preparation of salts of pyridine bases with volatile acids was set forth in Example 4.

Most of the salts of the above pyridine bases are somewhat hygroscopic; for example, 2-vinylpyridine hydrochloride, 4-vinylpyridine hydrobromide, and 2-vinyl-5-ethylpyridine hemi-sulfate. However, other salts such as 2-vinylpyridine hemi-oxalate (M.P.=147–149° C.) and 2-vinylpyridine chloroplatinate (M.P.=161–162° C.) are not hygroscopic and can be formulated in the dry state without special precautions to exclude moisture.

We claim:

1. The method of destroying nematodes in nematode-infested agricultural soils which comprises contacting the nematodes with a nematocidal compound selected from the group consisting of

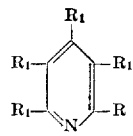

and

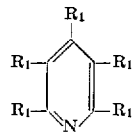

wherein R is a radical of the group consisting of

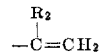

and

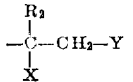

$R_1$ is a member of the group consisting of hydrogen and lower alkyl, $R_2$ is a member of the group consisting of hydrogen, chlorine and bromine, and X and Y are members of the group consisting of chlorine and bromine, and the acid addition salts thereof.

2. The method of controlling the nematode population in agricultural soils which comprises adding to and mixing with said soil a nematocidal compound selected from the group consisting of

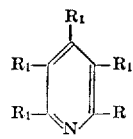

and

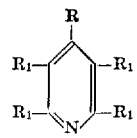

wherein R is a radical of the group consisting of

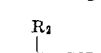

and

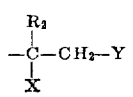

$R_1$ is a member of the group consisting of hydrogen and lower alkyl, $R_2$ is a member of the group consisting of hydrogen, chlorine and bromine, and X and Y are members of the group consisting of chlorine and bromine, and the acid addition salts thereof.

3. The method which comprises impregnating soil with a nematocidal compound of the group consisting of

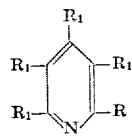

and

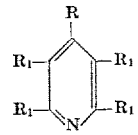

wherein R is a radical of the group consisting of

and

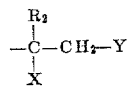

$R_1$ is a member of the group consisting of hydrogen and lower alkyl, $R_2$ is a member of the group consisting of hydrogen, chlorine and bromine, and X and Y are members of the group consisting of chlorine and bromine, and the acid addition salts thereof.

4. The process of claim 3 in which the nematocidal compound is 2-vinylpyridine.

5. The process of claim 3 in which the nematocidal compound is an acid addition salt of 2-(α,β-dichlorethyl)pyridine.

6. The process of claim 3 in which the nematocidal compound is an acid addition salt of 2-(α-chlorovinyl)pyridine.

7. The process of claim 3 in which the nematocidal compound is an acid addition salt of 2-(α-bromovinyl)pyridine.

8. The process which comprises applying to a nematode-infested soil from about 1 to about 256 lb. per acre of a pyridine base selected from the group consisting of

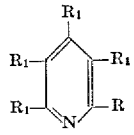

and

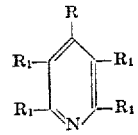

wherein R is a radical of the group consisting of

and

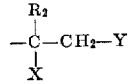

$R_1$ is a member of the group consisting of hydrogen and lower alkyl, $R_2$ is a member of the group consisting of hydrogen, chlorine and bromine, and X and Y are members of the group consisting of chlorine and bromine.

9. The process which comprises applying to a nematode-infested soil from about 4 to about 128 lb. per acre of a pyridine base selected from the group consisting of

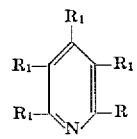

and

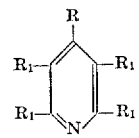

wherein R is a radical of the group consisting of

and

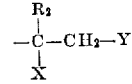

$R_1$ is a member of the group consisting of hydrogen and lower alkyl, $R_2$ is a member of the group consisting of hydrogen, chlorine and bromine, and X and Y are members of the group consisting of chlorine and bromine.

References Cited in the file of this patent
UNITED STATES PATENTS

| | | |
|---|---|---|
| 2,427,286 | Knapp et al. | Sept. 9, 1947 |
| 2,780,626 | Brown et al. | Feb. 5, 1957 |
| 2,853,417 | Werner et al. | Sept. 23, 1958 |
| 2,861,917 | Kosmin | Nov. 25, 1958 |
| 2,887,490 | Potts et al. | May 19, 1959 |

OTHER REFERENCES

Parnell et al.: Brit. J. Pharmacol. (1952), 7, 509–532 (particularly page 530).

UNITED STATES PATENT OFFICE
CERTIFICATE OF CORRECTION

Patent No. 3,105,005                                    September 24, 1963

William N. Cannon et al.

It is hereby certified that error appears in the above numbered patent requiring correction and that the said Letters Patent should read as corrected below.

Column 3, CHART II, under the column heading "Name", line 3 thereof, for "2-(α-β-Dichlorethyl)" read -- 2-(α,β-Dichlorethyl) --; column 6, line 57, for "2-(α,β-Chlorovinyl)" read -- 2-(α-Chlorovinyl) --; column 7, line 42, before "2-(α,α,β-" insert -- Perparation of --; line 50, for "chloroxvinylpyridine" read -- chlorovinylpyridine --; column 8, lines 23 to 27, the structural formula should appear as shown below instead of as in the patent:

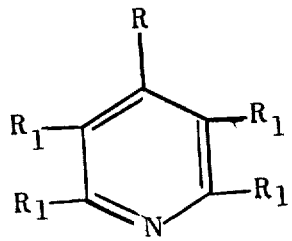

Signed and sealed this 12th day of May 1964.

(SEAL)
Attest:

ERNEST W. SWIDER
Attesting Officer

EDWARD J. BRENNER
Commissioner of Patents